(12) United States Patent
Boonprasop

(10) Patent No.: US 9,441,748 B2
(45) Date of Patent: *Sep. 13, 2016

(54) FLOW CONTROL AND TRAINING CUP VALVE ASSEMBLIES

(71) Applicant: Mikko Vault, LLC, Weston, FL (US)

(72) Inventor: Pruck Boonprasop, Bangkok (TH)

(73) Assignee: Mikko Vault, LLC, Weston, FL (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/287,351

(22) Filed: May 27, 2014

(65) Prior Publication Data

US 2014/0251939 A1    Sep. 11, 2014

Related U.S. Application Data

(63) Continuation-in-part of application No. 13/743,473, filed on Jan. 17, 2013, now Pat. No. 8,733,565.

(51) Int. Cl.
| | |
|---|---|
| *A61J 9/04* | (2006.01) |
| *F16K 17/00* | (2006.01) |
| *A61J 11/00* | (2006.01) |
| *A61J 11/02* | (2006.01) |
| *A61J 11/04* | (2006.01) |

(52) U.S. Cl.
CPC .............. *F16K 17/00* (2013.01); *A61J 11/002* (2013.01); *A61J 11/02* (2013.01); *A61J 11/04* (2013.01); *Y10T 137/7838* (2015.04); *Y10T 137/7879* (2015.04)

(58) Field of Classification Search
CPC ....................................................... A61J 9/00
USPC .................................. 215/11.1–11.5; 29/248
See application file for complete search history.

(56) References Cited

U.S. PATENT DOCUMENTS

| | | |
|---|---|---|
| 2,616,581 A | 11/1952 | Madsen et al. |
| 2,774,500 A | 12/1956 | Budiani |
| 2,979,078 A | 4/1961 | Witz |
| 3,207,349 A | 9/1965 | Rabe |
| 3,358,864 A | 12/1967 | Meierhoefer |
| 3,393,817 A | 7/1968 | Meierhoefer |
| 3,424,157 A | 1/1969 | Di Paolo |
| 3,549,036 A | 12/1970 | Ritsi |
| 3,593,870 A | 7/1971 | Anderson |
| 3,722,728 A | 3/1973 | Yazaki |
| 4,782,975 A | 11/1988 | Coy |
| 4,828,141 A | 5/1989 | Coy |
| 4,946,062 A | 8/1990 | Coy |
| 4,993,568 A | 2/1991 | Morifuji et al. |

(Continued)

*Primary Examiner* — Anthony Stashick
*Assistant Examiner* — Raven Collins
(74) *Attorney, Agent, or Firm* — Malloy & Malloy, P.L.

(57) ABSTRACT

A nipple assembly is removably attachable to a baby bottle via a retainer ring and comprises a nipple having a flow aperture through one end, and a nipple flange structured to support the nipple. A flow control valve assembly is mounted to the nipple flange and extends inwardly from an inner surface of the nipple flange, the flow control valve assembly is structured to allow pressures to equilibrate between the inside and outside of the baby bottle, without allowing fluid to leak therethrough. A training cup spout assembly is removably attachable to a cup and comprises a spout having a spout channel extending therethrough. The spout channel has a dual valve assembly mounted therein to permit flow for drinking, as well as to prevent leakage of fluid from the cup. A flow control valve assembly is mounted to the training cup spout assembly to permit pressure equilibration.

20 Claims, 8 Drawing Sheets

(56) References Cited

U.S. PATENT DOCUMENTS

| | | |
|---|---|---|
| 5,101,991 A | 4/1992 | Morifuji et al. |
| 5,474,028 A | 12/1995 | Larson et al. |
| 5,678,710 A | 10/1997 | Sheu |
| 5,779,071 A | 7/1998 | Brown et al. |
| 5,784,999 A | 7/1998 | Larson et al. |
| 5,881,893 A | 3/1999 | Manganiello |
| 5,890,619 A | 4/1999 | Belanger |
| 6,102,245 A | 8/2000 | Haberman |
| 6,116,457 A | 9/2000 | Haberman |
| 6,354,459 B1 | 3/2002 | Hagihara |
| 6,371,315 B1 | 4/2002 | Chien |
| 6,568,557 B2 | 5/2003 | Fusco et al. |
| 6,588,613 B1 | 7/2003 | Pechenik et al. |
| 7,150,370 B2 | 12/2006 | Pyun |
| 7,267,245 B2 | 9/2007 | Yang |
| 7,959,021 B2 | 6/2011 | Liang |
| 8,579,132 B2 | 11/2013 | Wong |
| 2005/0252875 A1 | 11/2005 | Sheu et al. |
| 2007/0068890 A1 | 3/2007 | Rohrig |
| 2007/0221604 A1 | 9/2007 | Hakim |
| 2009/0014403 A1 | 1/2009 | Lu |
| 2009/0200257 A1 | 8/2009 | McKendry et al. |
| 2010/0147862 A1 | 6/2010 | Keefe et al. |
| 2012/0012550 A1 | 1/2012 | Boonprasop |

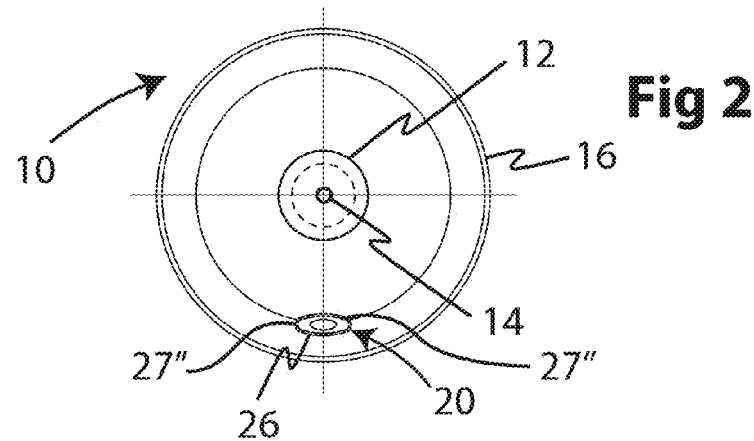
Fig 2
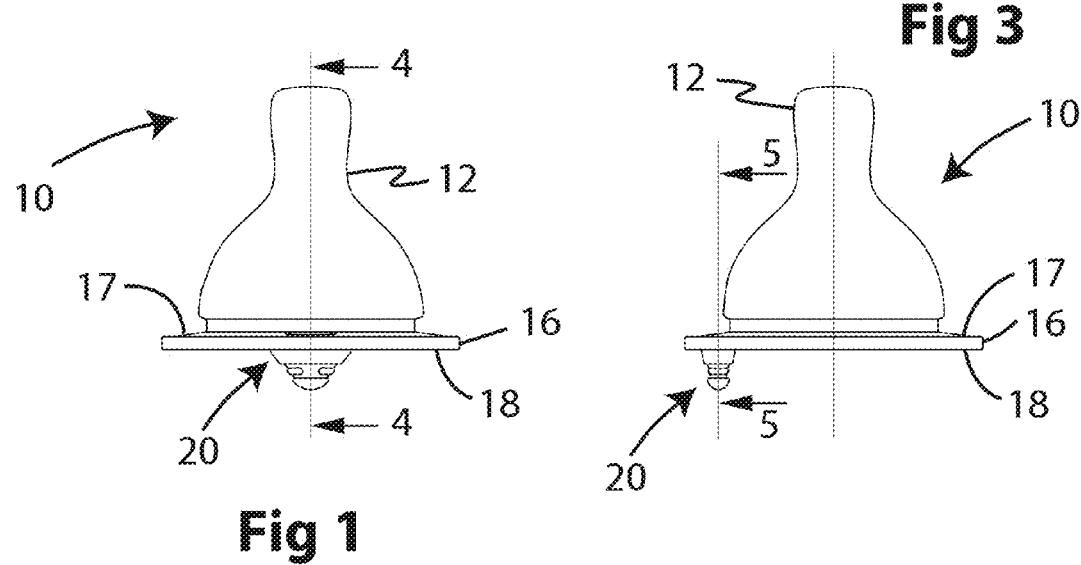
Fig 3
Fig 1

FLOW CONTROL AND TRAINING CUP VALVE ASSEMBLIES

BACKGROUND OF THE INVENTION

1. Field of the Invention

The present invention is directed to a flow control valve assembly for use in combination with a nipple assembly for a baby bottle. The flow control valve assembly is structured to provide a smooth and even flow of fluid from the baby bottle into the baby's mouth and stomach and, importantly, to prevent unnecessary introduction of air into the baby's stomach which may cause various forms of distress, such as colic, while positively sealing when suckling stops to prevent leakage. The present invention is further directed to an improved training cup spout assembly comprising a dual valve assembly, either alone, or in combination with a flow control valve assembly. The dual valve assembly is structured to permit flow therethrough with minimum suction pressure to teach infants to drink without suckling, as well as to positively seal the spout to prevent leakage of liquid therefrom.

2. Description of the Related Art

Traditionally, baby bottles comprise a nipple assembly having a nipple with an aperture through one end to allow fluid to flow from a bottle and through the nipple upon application of suction over the aperture in the nipple, such as, the natural suckling action of a newborn or infant child. Of course, it has long been understood that while an accepted means for delivering fluids, such traditional baby bottle/nipple structures are not always best for the newborn or infant. As one example, during sustained suckling, a vacuum builds inside of the baby bottle, oftentimes decreasing or even stopping fluid flow as the nipple partially or fully collapses. When either occurs, it is common for a newborn or infant or child to suck air into his or her stomach while struggling to get fluid out of the collapsed or partially collapsed nipple. The introduction of air into a newborn or infants stomach is responsible for causing discomfort, and can result in colic.

One attempt to overcome this problem is to provide a collapsible fluid insert which is placed inside of a baby bottle to eliminate a vacuum build-up inside of the bottle itself such as can cause a nipple to partially or fully collapse, and thus minimize the introduction of air into a newborn or infant's stomach while feeding. While arguably effective for this purpose, the addition of a separate fluid insert inside of a bottle adds to the time required to prepare a bottle for feeding, as well as to clean up afterwards. Furthermore, these additional components necessarily add additional cost, which can be significant given the fact that most infants will continue to feed from a bottle/nipple structure for one to two years or more.

Another alternative involves the incorporation of a pressure equalization valve across a portion of a nipple which is not subject to suction by the newborn or infant, e.g., at the base of the nipple. When the pressures inside and outside of a baby bottle are essentially the same, the tendency of a nipple to collapse is significantly reduced, and the introduction of air into a newborn or infant's stomach as a result of the same is also significantly reduced. While this alternative eliminates the time and cost disadvantages of a separate fluid bag inside of a bottle, it presents different drawbacks in that known pressure equalization valves do not easily open under mild suction pressures and as a result, the newborn or infant is again struggling to feed, which can lead to ingestion of air. More importantly, in general, known pressure equalization valves do not positively seal resulting in unnecessary leakage. As a result, the risk for air ingestion is not fully eliminated, and time is often required to clean up formula, milk or other fluid that has leaked out onto the newborn or infant, its clothes, and the surrounding areas.

As such, it would be beneficial to provide a flow control valve assembly that provides the benefit of pressure equilibration, yet prevents unnecessary leakage or spillage therethrough. It would be further advantageous for such a flow control valve assembly to adjustably open depending on the amount of suction pressure being applied via a nipple, such that pressure equilibration occurs even under mild suction pressures. Yet a further benefit may be realized from a flow control valve assembly comprising planar sealing surfaces which remain substantially parallel to one other at any point between a fully closed orientation and a fully open orientation, to facilitate ease in opening and positive sealing upon closure.

As infants grow and mature, they are eventually weaned off baby bottle/nipple structures in order to drink out of a cup or glass without suckling. Of course, this transition does not occur overnight, and oftentimes, many months are required before a child learns how to drink without suckling, and even longer to learn to hold a cup or glass without spilling its contents all over him or herself, and their surroundings.

As such, training cups having a fluid tight cover and a spout are often employed to aid children with this transition. In its simplest form, a training cup includes a spout open through a lid into a fluid containing cup or bottle. Of course, at least at first, children will knock over, tip over, and even throw the cup or bottle, and fluid is free to spill out making mess which must be cleaned up. In order to combat this problem, various valves have been employed in association with a spout in attempts to prevent this spillage and subsequent cleanup effort. Unfortunately, these valves suffer the same types of problems noted above with regard to known pressure equalization valves, that is, they often do not readily or adjustably open to permit fluid flow and once again, more importantly, they fail to positively close and seal thereby still allowing fluid to leak or spill and still creating a mess which must be cleaned.

As such, it would be further beneficial to provide a training cup spout assembly having a valve mechanism that opens easily to permit fluid flow therethrough upon application of minimal pressure forces to the spout, and that positively closes and seals to prevent leakage or spillage through the valve assembly once pressure is removed from the spout. Yet another benefit may be realized by providing a training cup spout assembly having a redundant valve assembly to assure positive closure and sealing to prevent fluid leakage or spillage therethrough. A further advantage may be obtained by providing such a training cup spout assembly with a flow control valve assembly to provide a smooth and even flow of fluid through the spout of the training cup or bottle.

SUMMARY OF THE INVENTION

The present disclosure, in one aspect, is directed to a nipple assembly structured to be removably attached to a baby bottle via a retainer ring. The nipple assembly comprises a nipple having a flow aperture disposed through one end, and a nipple flange structured and disposed to support the nipple, wherein the nipple extends outwardly from an outer surface of said nipple flange. It is a further aspect of at least one embodiment of the present disclosure to provide a flow control valve assembly mounted to the nipple flange, wherein the flow control valve assembly, in at least one embodiment, extends inwardly from an inner surface of the nipple flange.

In accordance with one embodiment of the present disclosure, the flow control valve assembly comprises a port disposed through a portion of the nipple flange, and an elongated channel substantially surrounded by a channel wall, wherein the elongated channel has an open proximal end and an oppositely disposed distal end, and the open proximal end of the elongated channel is disposed in fluid communication with the port.

The channel wall, in at least one further embodiment, comprises a fixed wall attached to the nipple flange along and around a periphery of the port, and in one further embodiment, the channel wall comprises an expandable wall attached along and around a periphery of the fixed wall. Finally, a channel header is attached to the expandable wall, effectively sealing the elongated channel at its distal end.

The flow control valve assembly further comprises at least one valve member mounted to the expandable wall, and in at least one embodiment, a plurality of valve members are mounted to the expandable wall. In yet one further embodiment, the flow control valve assembly in accordance with the present disclosure comprises a plurality of unidirectional valve members attached to an expandable wall.

Each of the plurality of unidirectional valve members comprises complementary substantially planar sealing surfaces disposable between a closed orientation and an open orientation, in accordance with at least one embodiment, wherein the closed orientation is at least partially defined by corresponding ones of the complementary substantially planar sealing surfaces abutting one another, and the open orientation is at least partially defined by corresponding ones of the complementary substantially planar sealing surfaces positioned a spaced distance apart from one another forming a pressure equilibration flow path therebetween, to permit air to flow in through the elongated channel to equilibrate pressures on opposite sides of the channel wall.

In one further embodiment, the corresponding ones of the complementary substantially planar sealing surfaces are maintained substantially parallel relative to one another between the closed orientation and the open orientation, so as to facilitate ease in opening and positive sealing upon closure.

It is another aspect of the present disclosure to present a training cup spout assembly removably attachable to a drinking cup wherein the spout assembly comprises a spout having a spout channel extending therethrough, and a spout channel surrounded by a channel wall having an open proximal end and an oppositely disposed open distal end. The spout is attached to and extends outwardly from an outer surface of a spout flange and, in at least one embodiment, the spout comprises a dual valve assembly mounted in the spout channel.

In one further aspect of the present disclosure, a dual valve assembly comprises a diaphragm valve member mounted in a spout channel between oppositely disposed open ends thereof. The diaphragm valve member includes a pair of substantially planar diaphragm surfaces, wherein each of the diaphragm surfaces is attached in a sealing engagement along oppositely disposed internal surfaces of the spout channel, and further, the diaphragm surfaces are cooperatively configured to define a diaphragm aperture therebetween.

It is a further aspect for a dome valve member to be mounted to the diaphragm valve member, and in at least one embodiment, the dome valve member is disposed in an overlying relation to said diaphragm aperture. The dome valve member, in at least one embodiment comprises complementary sealing surfaces disposable between a closed orientation and an open orientation, wherein the closed orientation is at least partially defined by the complementary sealing surfaces abutting one another, and the open orientation is at least partially defined by the complementary sealing surfaces being positioned a spaced distance apart from one another to form a fluid flow path therethrough extending from the open distal end of the spout channel, between the complementary sealing surfaces of the dome valve member, through the diaphragm aperture, and to the open proximal end of the spout channel.

In one further embodiment, a flow control valve assembly is mounted to the spout flange and comprises a flow control valve member disposable between a closed orientation and an open orientation, wherein the open orientation permits pressures to equilibrate on opposite sides of the flow control valve assembly.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is front elevation illustrative of one embodiment of a nipple assembly comprising a flow control valve assembly in accordance with the present disclosure.

FIG. 2 is a top plan view of the embodiment of the nipple assembly as shown in FIG. 1.

FIG. 3 is a side elevation of the embodiment of the nipple assembly comprising a flow control valve assembly as shown in FIG. 1.

Like reference numerals refer to like parts throughout the several views of the drawings.

DETAILED DESCRIPTION OF THE PREFERRED EMBODIMENT

Figure 12:
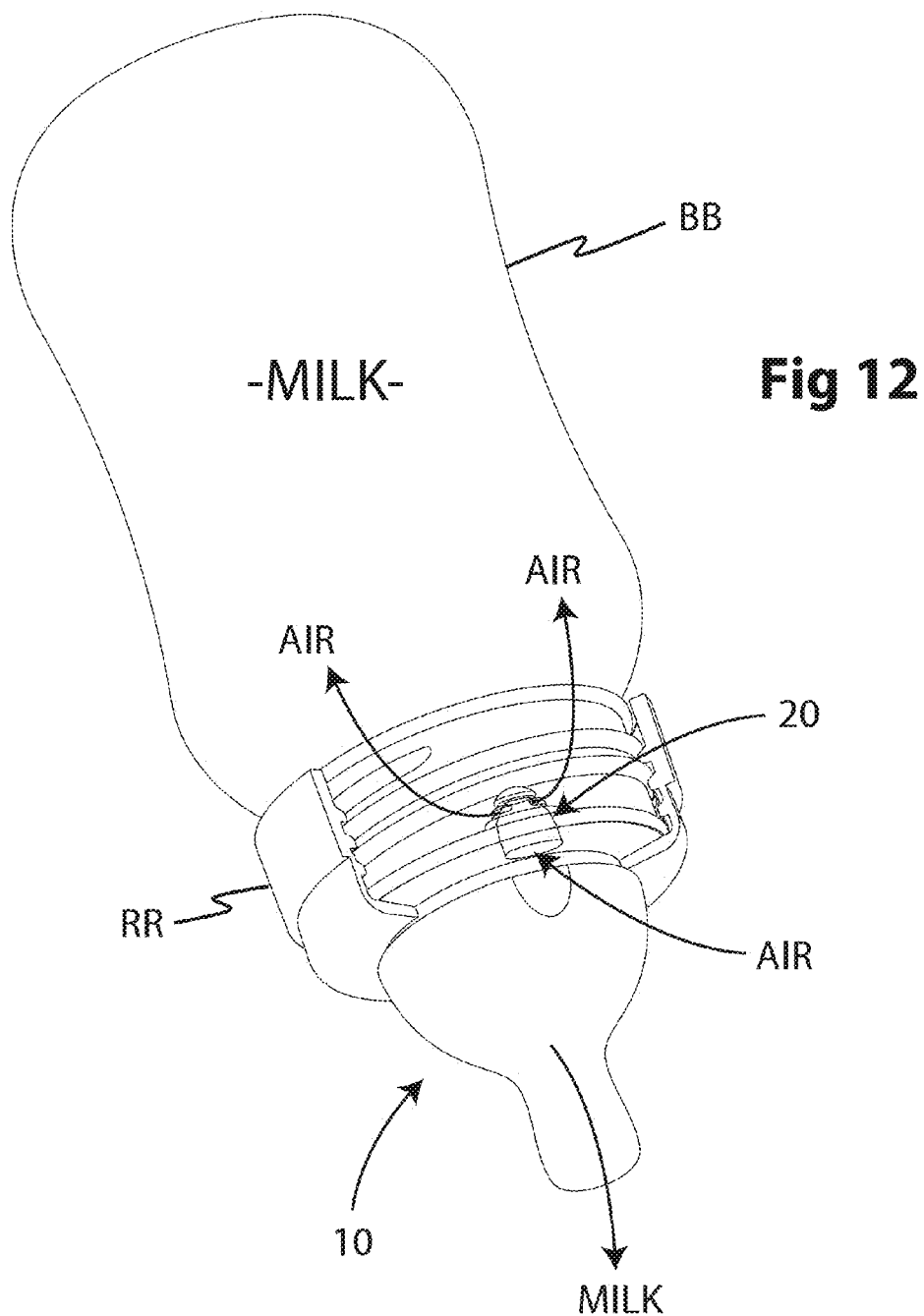
FIG. 12 is a perspective view of one embodiment of a nipple assembly comprising a flow control valve in accordance with the present disclosure removably mounted to a baby bottle via a retainer ring.

It is one aspect of the present disclosure to provide a nipple assembly, generally as shown as 10 throughout the figures, which is removably attachable to a baby bottle ("BB") via a retainer ring ("RR") or similar structure. More in particular, the present disclosure is directed to a nipple assembly 10 comprising a flow control valve assembly generally shown as at 20 throughout the figures. FIG. 12 is illustrative of one embodiment of a nipple assembly 10 comprising a flow control valve assembly 20 in accordance with the present disclosure removably attached to a baby bottle ("BB") via a retaining ring ("RR").

FIG. 1 presents a front elevation illustrative of one embodiment of a nipple assembly 10 comprising a flow control valve assembly 20 in accordance with the present disclosure. FIG. 2 presents a top plan view of the nipple assembly 10 of FIG. 1, and FIG. 3 is a side elevation of the nipple assembly 10 having a flow control valve assembly 20 as shown in the illustrative embodiment of FIG. 1.

As may be seen from these figures, a nipple assembly 10 includes a nipple 12 having a flow aperture 14 through one end. As further illustrated in FIGS. 1 through 3, a nipple assembly 10 in accordance with the present disclosure comprises a nipple flange 16 structured and disposed to support the nipple 12. In at least one embodiment, the nipple 12 extends outwardly from an outer surface 17 of the nipple flange 16, as best shown in FIGS. 1 and 3.

In at least one embodiment, a flow control valve assembly 20 is mounted to a nipple flange 16, such as is shown in the illustrative embodiments of FIGS. 1 through 4. More in particular, as seen in these illustrative embodiments, a flow control valve assembly 20 is mounted to an inner surface 18 of a nipple flange 16 and extends inwardly therefrom in a direction opposite outwardly extending nipple 12. As further shown in the figures, at least a portion of a flow control valve assembly 20 in accordance with at least one embodiment comprises an elliptical cross section 26 having a major axis 27 and a minor axis 27', which collectively and cooperatively define the elliptical cross section 26.

Figure 4:
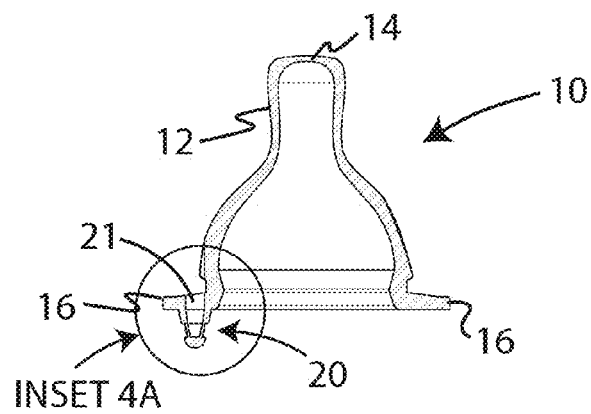
FIG. 4 is a cross-sectional view of the embodiment of the nipple assembly comprising a flow control valve assembly as shown in FIG. 1 along lines 4-4 thereof.
Figure 5:
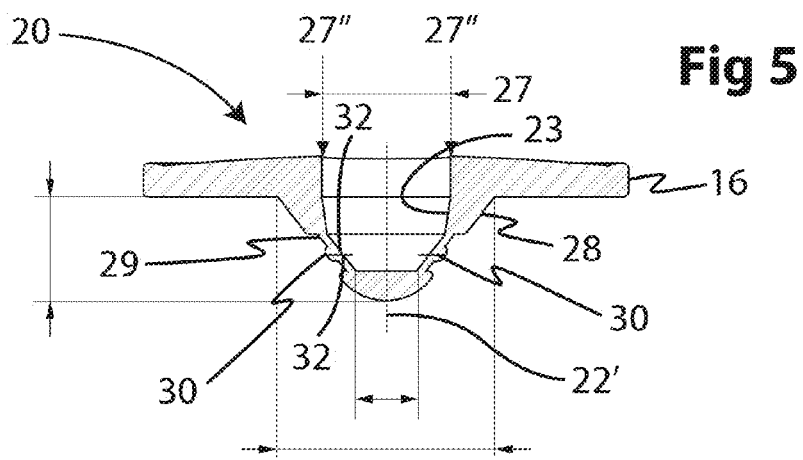
FIG. 5 is a cross-sectional view of the flow control valve assembly as shown in FIG. 3 along lines 5-5 thereof.

FIG. 4 is a cross-sectional view of one embodiment a nipple assembly 10 in accordance with the present disclosure taken along lines 4-4 through of the illustrative embodiment of FIG. 1. FIG. 4 further includes Inset 4A which presents a more detailed cross-sectional view of one embodiment of a flow control valve assembly 20 in accordance with the present disclosure. Further, FIG. 5 presents a cross-section through a major axis 27 of the elliptical cross section 26 of flow control valve assembly 20 along lines 5-5 of the illustrative embodiment of FIG. 3.

Figure 4A:
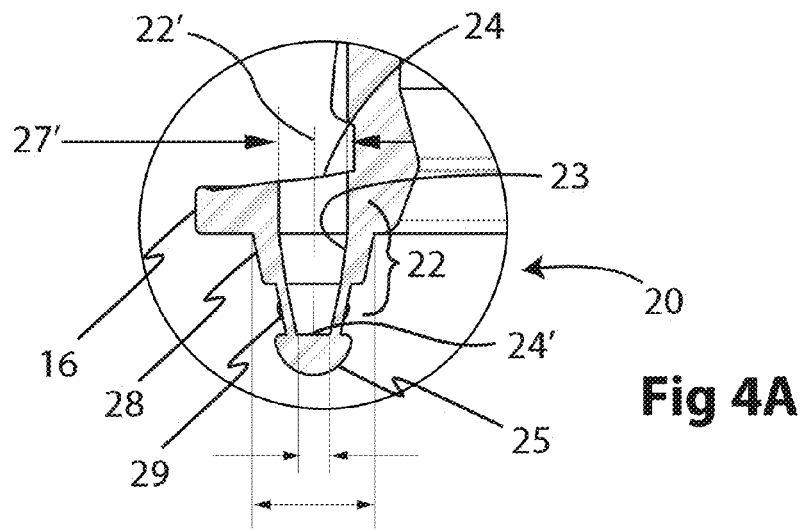
FIG. 4A is an enlarged cross-sectional view of the flow control valve assembly as shown in Inset 4A of FIG. 4.

FIG. 4A, as previously noted, is an enlarged cross-sectional view of a flow control valve assembly 20 as shown in Inset 4A of FIG. 4. More in particular, FIG. 4A presents a cross section through a minor axis 27' of the elliptical cross section 26 of a flow control valve assembly 20 in accordance with at least one embodiment of the present disclosure. As may be seen from FIG. 4, the flow control valve assembly 20 comprises a port 21 which is disposed through a portion of the nipple flange 16. The flow control valve assembly 20 further comprises a channel 22, and in at least one embodiment, such as illustrated in FIG. 4A, the flow control valve assembly 20 comprises an elongated channel 22. In at least one further embodiment, the elongated channel 22 is substantially surrounded by a channel wall 23, and the elongated channel 22 comprises an open proximal end 24 and oppositely disposed distal end 24'. The open proximal end 24 of the elongated channel 22 is disposed in a fluid communicating relation with the port 21, as shown in FIGS. 4 and 4A.

The channel wall 23 in accordance with at least one embodiment of the present disclosure, includes a fixed wall 28 attached to the nipple flange 16 and positioned along and around a periphery the port 21 on the inner surface 18 of the nipple flange 16. The channel wall 23 in accordance with yet one further embodiment comprises an expandable wall 29 as shown in the figures. The expandable wall 29 is attached to a distal end of the fixed wall 29 along and around a periphery thereof. A channel header 25 is attached to a distal end of the expandable wall 29 and in at least one embodiment, the channel header 25 is attached to the expandable wall 29 in a sealing engagement with the distal end 24' of the channel 22.

Of course, it is envisioned that the flow control valve assembly 20 of the present disclosure may be employed in other structures or devices, and as such, may be independently mounted to a valve mount having a corresponding port therethrough, with fixed wall 28, expandable wall 29, and channel header 25 mounted correspondingly thereto.

Both the fixed wall 28 and the channel header 25 comprises a greater thickness than the expandable wall 29, thereby facilitating the resilient deformation of the expandable wall 29 during operation of the present flow control valve assembly 20, as explained in further detail below. In one embodiment, at least the expandable wall 29 is constructed of silicone, a known resilient material, however, in at least one further embodiment, the entire flow control valve assembly 20 is constructed of silicone, and as such, the thickness of different components of the valve assembly 20 will substantially dictate the performance of the various components of valve assembly 20 under a pressure load. In yet one further embodiment, the entire nipple assembly 10, including the flow control valve assembly 20 is constructed of silicone, or another resilient, safe, approved food grade material of construction.

Figure 5A:
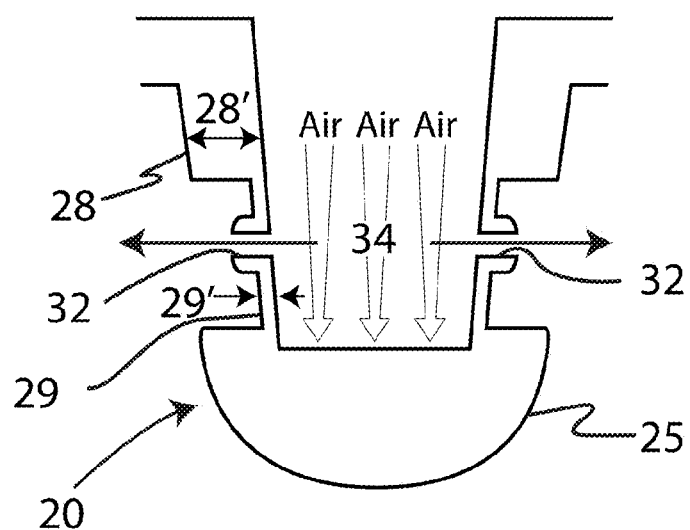
FIG. 5A is a partial cross-sectional view of one further embodiment of a flow control valve assembly in accordance with the present disclosure disposed in an open orientation.

In at least one embodiment, the fixed wall 28 comprises a mean thickness 28', as shown in FIG. 5A. In one embodiment, the fixed wall 28 comprises a mean thickness 28' in a range of about 0.8 millimeters to about 2.4 millimeters, and in one further embodiment, the fixed wall 28 comprises a mean thickness 28' in a range of about 1.2 millimeters to about 1.8 millimeters. As further shown in FIG. 5A, the expandable wall 29 comprises a mean thickness 29', which in one embodiment is in a range of about 0.4 millimeters to about 0.8 millimeters, and in at least one further embodiment, the expandable wall 29 comprises a mean thickness 29' of about 0.6 millimeters. The channel header comprises a mean thickness, as measured vertically from the distal end 24' of the elongated channel 22 which is in a range of about 1.0 to 3.0 millimeters.

Looking further to the illustrative embodiment of FIG. 5, the flow control valve assembly 20 in accordance with the present disclosure includes at least one valve member 30 mounted to the expandable wall 29 of the elongated channel 22. In at least one embodiment, a flow control valve assembly 20 comprises a plurality of valve members 30, and in yet one further embodiment, a flow control valve assembly 20 comprises a plurality of unidirectional valve members 30, as discussed in more detail below.

FIG. 5 further illustrates that in at least one embodiment, each valve member 30 is mounted to the expandable wall 29 proximate a vertex 27" of the major axis 27 of the elliptical cross section 26 of the elongated channel 22 along the expandable wall 29. FIG. 5 is further illustrative of a plurality of unidirectional valve members 30 disposed in a closed orientation, wherein corresponding complimentary sealing surfaces 32 of the unidirectional valve members 30 comprise planar configurations, such as is illustrated best in FIG. 5A, and are disposed in a substantially parallel abutting and sealed relation relative to one another.

Turning next to FIG. 5A, a further embodiment of a flow control valve assembly 20 in accordance with the present invention is presented. More in particular, FIG. 5A illustrates an embodiment of a flow control valve assembly 20 in accordance with the present disclosure disposed in an open orientation. As illustrated in FIG. 5A, when a negative pressure is applied around a flow control valve assembly 20, for example, via suction applied to the nipple 12 on a baby bottle ("BB") by a baby such that the pressure inside of the baby bottle ("BB") decreases, the expandable wall 29 of the flow control valve assembly 20 is pulled or stretched inwardly thereby separating corresponding complimentary substantially planar sealing surfaces 32 of each of the plurality of unidirectional valve members 30, forming pressure equilibration flow paths 34 therebetween.

More in particular, as noted above, fixed wall 28 comprises a mean thickness 28' and expandable wall 29 comprises a mean thickness 29' which, as illustrated best in FIGS. 5 and 5A, is substantially less than the mean thickness 28' of fixed wall 28. As such, upon application of negative pressure inside baby bottle ("BB"), expandable wall 29 resiliently expands inwardly into the baby bottle ("BB") thereby separating complimentary substantially planar sealing surfaces 32 of valve members 30 in the process. Conversely, once negative pressure is no longer applied, the expandable wall 29 retracts back to its original unbiased position wherein corresponding complimentary substantially planar sealing surfaces 32 of each of the plurality of unidirectional valve members 30 return to an abutting and sealing relationship relative to one another, thereby defining a closed orientation of the valve members 30. Furthermore, application of a positive pressure within baby bottle ("BB"), such as, by blowing into the bottle through the nipple 12, will cause the corresponding complimentary substantially planar sealing surfaces 32 of each of the plurality of unidirectional valve members 30 to be held together in an abutting relationship relative to one another with greater force, thereby maintaining the closed orientation of the unidirectional valve members 30. Stated otherwise if the baby attempts to blow into the baby bottle ("BB") through nipple 12, liquid or other fluid within the bottle will not be able to escape from the baby bottle ("BB") through the unidirectional valve members 30.

Furthermore, as a result of the mean thickness differential between the expandable wall 29, and the fixed wall 28 and channel header 25, the expandable wall 29 will stretch evenly and resiliently along the substantially vertical axis 22' through the elongated channel 22, thereby maintaining corresponding ones of the complimentary substantially planar sealing surfaces 32 in substantially planar alignment with one another between a fully closed configuration, such as is shown in FIG. 5, and a fully open orientation, as in FIG. 5A. This configuration further facilitates easy and even opening of the unidirectional valve members 30 under minimal suction pressure loads, as well as positive sealing thereof as a result of the complimentary substantially planar sealing surfaces 32 being maintained in substantially planar alignment with one another whether opening or closing.

Figure 7:
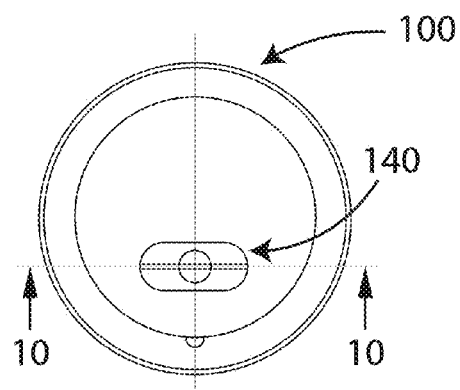
FIG. 7 is a top plan view of the training cup spout assembly as illustrated in FIG. 6.
Figure 6:
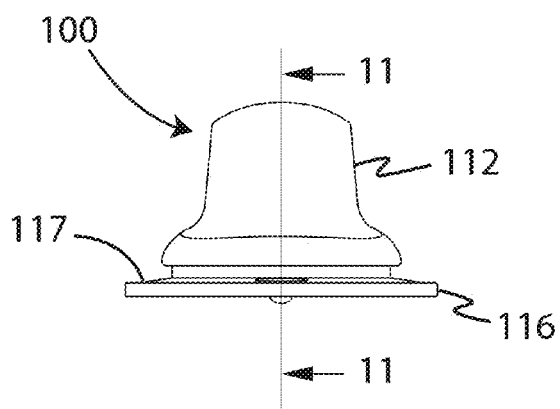
FIG. 6 is a front elevation of a training cup spout assembly in accordance with one embodiment of the present disclosure.
Figure 8:
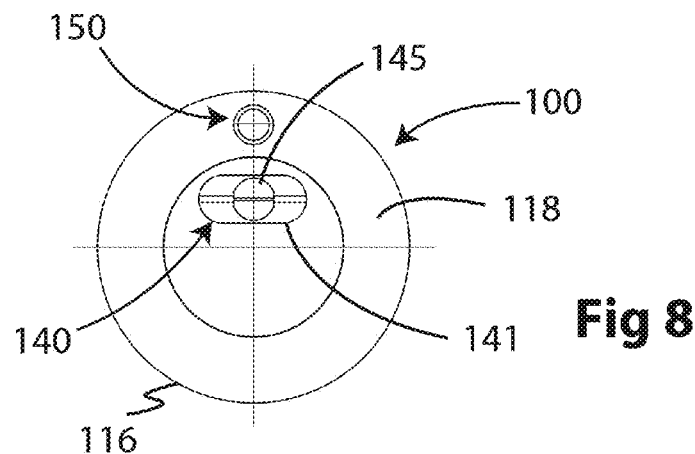
FIG. 8 is a bottom plan view of the training cup spout assembly as shown in FIG. 6 illustrative of one embodiment of a dual valve assembly and a flow control valve assembly in accordance with the present disclosure.

Another aspect of the present disclosure is to present a training cup spout assembly, generally as shown as 100 throughout the figures. FIG. 6 is illustrative of one embodiment of a training cup spout assembly 100 in accordance with the present invention. Further, FIGS. 7 and 8 present top and bottom plan views, respectively, of the embodiment of the training cup spout assembly 100 as shown in FIG. 6. In addition, FIG. 9 presents a side elevation of the embodiment of the training cup spout assembly 100 as shown in FIG. 6.

Figure 9:
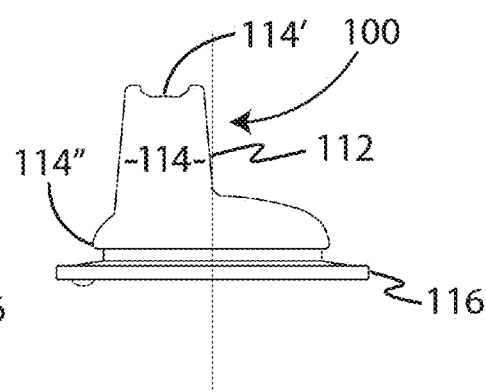
FIG. 9 is a side elevation of the training cup spout assembly as shown in FIG. 6.
Figure 10:
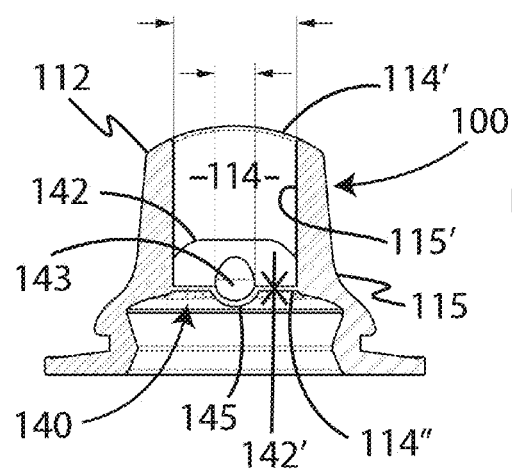
FIG. 10 is a cross-sectional view of the training cup spout assembly as shown in FIG. 7 along lines 10-10 thereof further illustrative of one embodiment of a dual valve assembly in accordance with the present disclosure.

A training cup spout assembly 100 in accordance with the illustrative embodiment of FIGS. 6 and 9 includes a spout 112 comprising an elongated configuration and extending upwardly and outwardly from a spout flange 116 on which it is mounted. The spout 112 comprises a spout channel 114 extending therethrough having a proximal end 114' and a distal end 114". As shown in FIG. 10, in at least one embodiment, spout channel 114 is substantially surrounded by a channel wall 115.

Furthermore, in at least one embodiment of the training cup spout assembly 100 in accordance with the present disclosure, a dual valve assembly 140 is mounted in the spout channel 114. More in particular, and as illustrated best in FIGS. 10 and 11, the dual valve assembly 140 is mounted inside of spout channel 114 proximate a distal end 114" thereof.

The dual valve assembly 140 in accordance with at least one embodiment of the present disclosure is structured to perform to separate and seemingly inconsistent functions. First, and foremost, the dual valve assembly 140 in accordance with the present disclosure is structured to provide a positive seal across the spout channel 114 so as to prevent unwanted flow of liquid out of the proximal end 114' of the training cup spout assembly 100. Furthermore, however, the dual valve assembly 140 in accordance with the present invention is also structured to open upon application of minimal pressure or force 149' on channel wall 115, thereby causing oppositely disposed sides of the channel wall 115 to move slightly inward towards one another. Such external pressure may be applied in the form of lightly biting down on the outer surfaces of the channel wall 115, or via the application of a small amount of negative pressure such as, for example, by a baby or toddler sucking on the proximal end 114' of the spout 112, as illustrated schematically in FIG. 11B, thereby causing the inner surfaces 115' of the channel wall 115 to move inwardly towards one another.

FIG. 10 presents a cross-sectional view of the embodiment of the training cup spout assembly 100 of FIG. 7, along lines 10-10 thereof. As shown in the illustrative embodiment of FIGS. 10 and 11A, the dual valve assembly 140 includes a diaphragm valve member 141 comprising a pair of diaphragm surfaces 142. Further, as shown best in FIG. 11A, each of diaphragm surfaces 142 is attached along oppositely disposed internal surfaces 115' of the channel wall 115. In at least one embodiment, each diaphragm surface 142 is attached to an oppositely disposed internal surface 115' of the channel wall 115 in a sealing engagement, thereby preventing fluid from flowing between the internal surface 115' of the channel wall 115 and diaphragm surface 142, as illustrated best in FIG. 11A. In yet one further embodiment, the diaphragm surfaces 142 attached to oppositely disposed internal surfaces 115' of the channel wall 115 define a diaphragm aperture 143 therebetween.

In at least one embodiment, the diaphragm surfaces 142 are attached to the oppositely disposed inner surfaces 115' of the channel wall 115 at an angle 144. In one further embodiment, the diaphragm surfaces 142 are attached to the oppositely disposed inner surfaces 115' of the channel wall 115 at an angle 144 in a range of between about 140 to 160 degrees. As shown in the illustrative embodiment of FIG. 11A, the diaphragm surfaces 142 are attached to the oppositely disposed inner surfaces 115' of the channel wall 115 at an angle 144 of about 150 degrees relative to inner surfaces 115' of the channel wall 115. FIG. 11A also illustrates the diaphragm surfaces 142 attached at angle 144 and extending downwardly into the spout channel 114 and directed towards the distal end 114" thereof, as shown in FIG. 10. In at least one embodiment, and as illustrated throughout the figures, the diaphragm surfaces 142 comprise a relatively thin construction compared to the other components of the training cup spout assembly 100 or even the dual valve assembly 140, having a mean thickness 142' in a range of about 0.6 millimeters to about 0.8 millimeters. Further, the diaphragm surfaces 142 in at least one embodiment are constructed of a resilient material, such as silicone, thereby allowing the diaphragm surfaces 142 to move freely under minimal forces, such as those noted above. Of course, given the angled relation between the diaphragm surfaces 142, the only freedom for movement of the diaphragm surfaces 142 is apart from one another about the diaphragm aperture 143, the diaphragm surfaces 142 being otherwise attached to one other or to the oppositely disposed inner surfaces 115' of the channel wall 115, as shown in the figures.

Looking further to FIG. 11A, the dual valve assembly 140 further comprises a dome valve member 145 mounted to the diaphragm valve member 141, and more in particular, in a least one embodiment, the dome valve member 145 is mounted to the diaphragm valve member 141 in an overlying relation to the diaphragm aperture 143. As shown in the figures, the dome valve member 145 is attached to diaphragm valve member 141 downstream of the proximal end 114' of the spout channel 114.

Figure 11B:
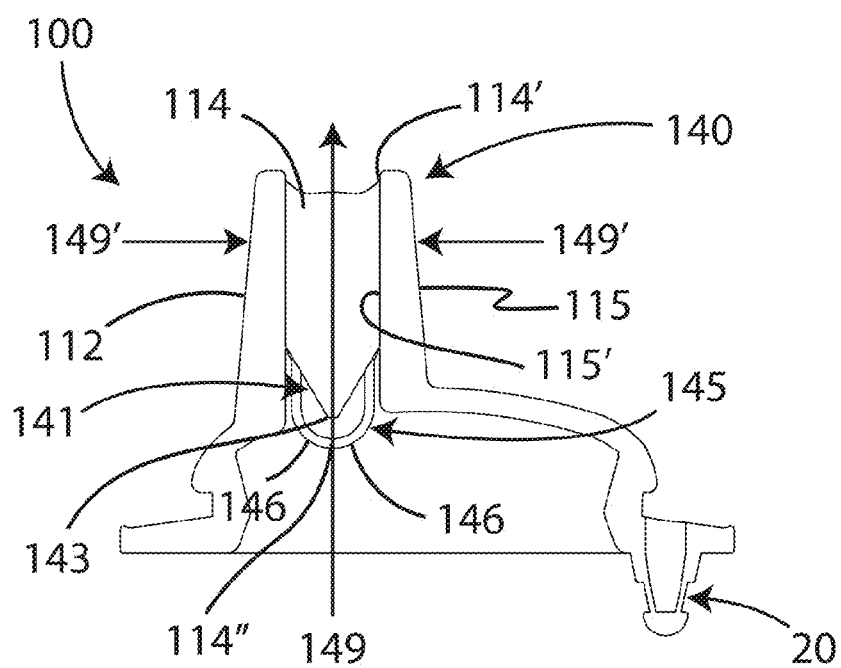
FIG. 11B is a partial cross-section view of one further embodiment of dual valve assembly in accordance with the present disclosure disposed in an open orientation.
Figure 11:
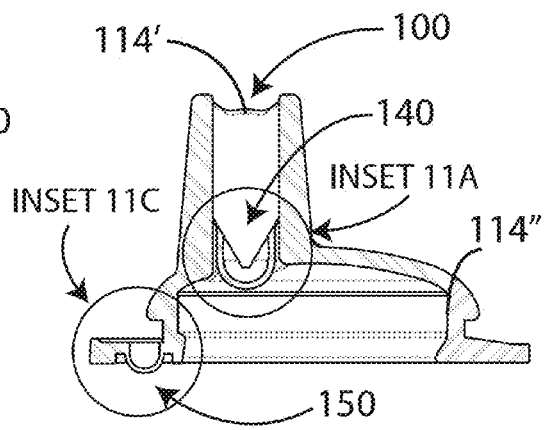
FIG. 11 is a cross-sectional view of the training cup spout assembly as shown in FIG. 6 along lines 11-11 thereof illustrative of one embodiment of a dual valve assembly and a flow control valve assembly in accordance with the present disclosure.
Figure 11A:
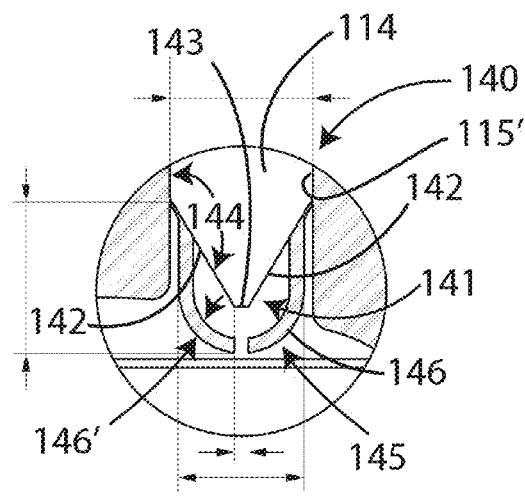
FIG. 11A is a partial cross-sectional view of the dual valve assembly as shown in Inset 11A of the FIG. 17.

The dome valve member 145 comprises complementary sealing surfaces 146 disposable between a closed orientation, as shown in FIG. 11, and an open orientation, such as is illustrated in FIGS. 11A and 11B. More in particular, with further reference to FIGS. 11A and 11B, when the dome valve member 145 is disposed in an open orientation, the complementary sealing surfaces 146 of dome valve member 145 are positioned a spaced distance from one another to form a fluid flow path 149 extending from the open distal end 114" of the spout channel 114, between the complementary sealing surfaces 146 of dome valve member 145, through the diaphragm aperture 143 of diaphragm valve 141, and into and out through open proximal end 114' of the spout channel 114.

More in particular, when sufficient, albeit minimal, force or pressure 149' is applied to the oppositely disposed sides of the channel wall 115, the inner surfaces 115' of the channel wall 115 move towards one another and the diaphragm surfaces 142 will move pivotally, their upper ends attached to the inner surfaces 115' moving towards one another while their opposite ends, adjacent diaphragm aperture 143, are forced apart from one another. As a result, the sealing surfaces 146 of the dome valve member 145, which are attached to opposite ones of the diaphragm surfaces 142, are also forced apart from one another, thereby forming the fluid flow path 149.

As readily seen from the figures, the sealing surfaces 146 of the dome valve member 145 comprise a considerably greater mean thickness 146' than the diaphragm surfaces 142. In at least one embodiment, the sealing surfaces 146 of dome valve member 145 comprise a mean thickness in a range of about 1.2 millimeters. In one further embodiment, the sealing surfaces 146 of the dome valve member 145 are also constructed of a resilient silicone or similarly safe and resilient material. Thus, once the force or pressure 149' is released from the channel wall 115, the resiliency of the sealing surfaces 146 will force the sealing surfaces 146 back into their normally closed, unbiased orientation, and as a result of the thickness differential, the diaphragm surfaces 142 will also be forced back into their normally closed, unbiased orientation along with the sealing members 146, as they are correspondingly attached thereto.

Figure 11C:
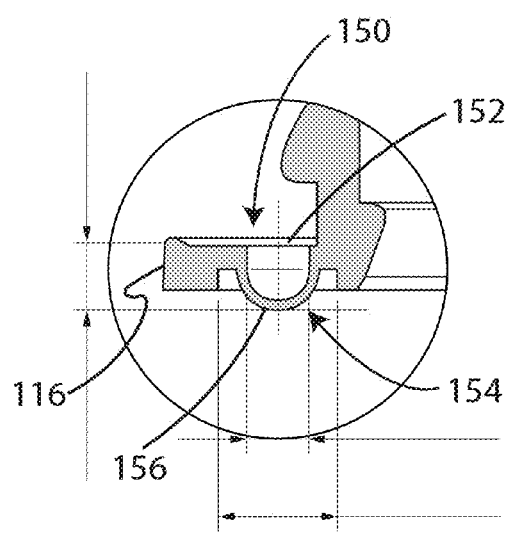
FIG. 11C is a partial cross-sectional view of the flow control valve assembly as illustrated in Inset 11C of FIG. 11.

FIGS. 6 through 9 and 11 are illustrative of an embodiment of a training cup spout assembly 100 comprising a dual valve assembly 140 in combination with a flow control valve assembly 150. Looking once again to FIG. 11, and in particular, Inset 11C, at least one embodiment of a training cup spout assembly 100 in accordance with the present disclosure comprises a flow control valve assembly 150. Looking further to FIG. 11C, flow control valve assembly 150 in accordance with this illustrated embodiment includes a dome control valve member 154 comprising a port 152 disposed through a portion of the spout flange 116. Dome control valve member 154 comprises complimentary sealing surfaces 156 which, in a similar fashion to the dome valve member 145 of the dual valve assembly 140 as disclosed above, are disposable between an open orientation, and a closed orientation as shown in FIG. 11C. Furthermore, when disposed in a spaced apart open orientation, complimentary sealing surfaces 156 of dome control valve member 154 permits pressures to equilibrate an opposite sides of flow control assembly 150.

FIGS. 11B and 13 through 17 are illustrative of one alternate embodiment of a training cup spout assembly 100 comprising a dual valve assembly 140 in combination with a flow control valve assembly 20, as disclosed above in detail with reference to the illustrative embodiments of FIGS. 1 through 5.

Figure 14:
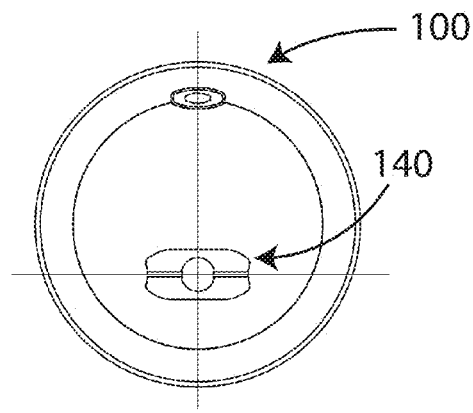
FIG. 14 is a top plan view of the training cup spout assembly as illustrated in FIG. 13.
Figures 13, 16:
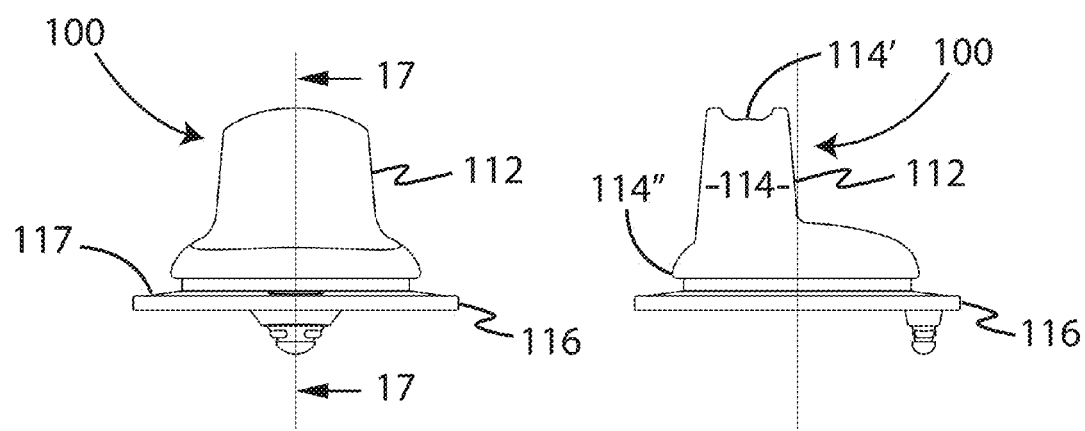
FIG. 13 is a front elevation of a training cup spout assembly in accordance with one alternate embodiment of the present disclosure.
FIG. 16 is a side elevation of the training cup spout assembly as shown in FIG. 13.
Figure 15:
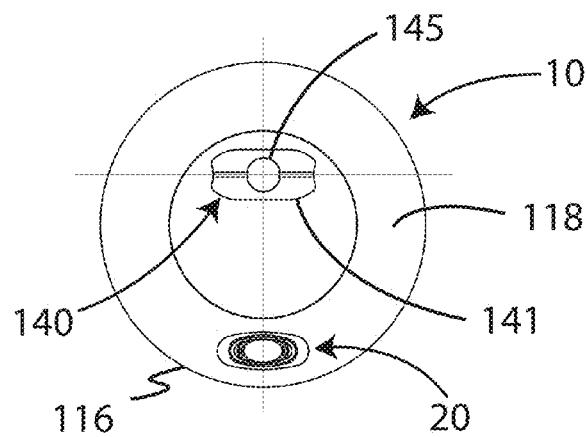
FIG. 15 is a bottom plan view of the training cup spout assembly as shown in FIG. 13 illustrative of one embodiment of a dual valve assembly and a flow control valve assembly in accordance with the present disclosure.

As noted above, FIG. 13 is illustrative of one alternate embodiment of a training cup spout assembly 100 in accordance with the present invention. Further, FIGS. 14 and 15 present top and bottom plan views, respectively, of the embodiment of the training cup spout assembly 100 as shown in FIG. 13. More in particular, FIG. 15 is illustrative of a training cup spout assembly 100 comprising a dual valve assembly 140 in combination with a flow control valve assembly 20 as disclosed above in detail with reference to the illustrative embodiments of FIGS. 1 through 5. In addition, FIG. 16 presents a side elevation of the embodiment of the training cup spout assembly 100 as shown in FIG. 13.

A training cup spout assembly 100 in accordance with the illustrative embodiment of FIGS. 13 and 16 includes a spout 112 comprising an elongated configuration and extending upwardly and outwardly from a spout flange 116 on which it is mounted. The spout 112 comprises a spout channel 114 extending therethrough having a proximal end 114' and a distal end 114", as shown in FIG. 16.

Furthermore, in at least one embodiment of the training cup spout assembly 100 in accordance with the present disclosure, a dual valve assembly 140 is mounted in the spout channel 114. More in particular, and as illustrated best in FIG. 17, the dual valve assembly 140 is mounted inside of spout channel 114 proximate a distal end 114" thereof.

Figure 17:
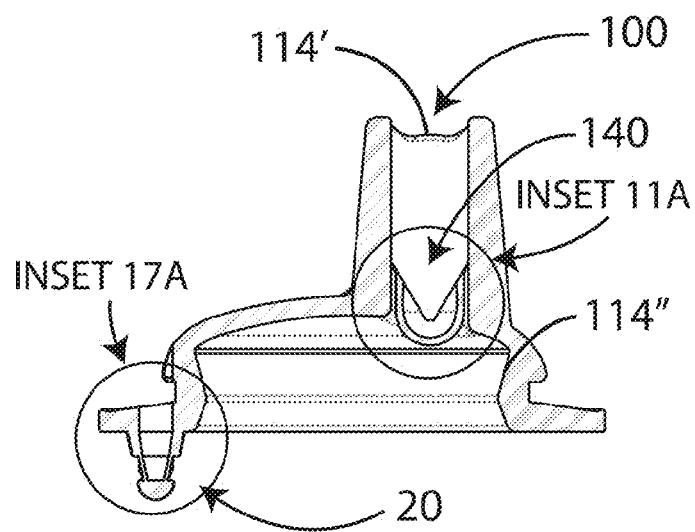
FIG. 17 is a cross-sectional view of the training cup spout assembly as shown in FIG. 13 along lines 17-17 thereof illustrative of one embodiment of a dual valve assembly and a flow control valve assembly in accordance with the present disclosure.
Figure 17A:
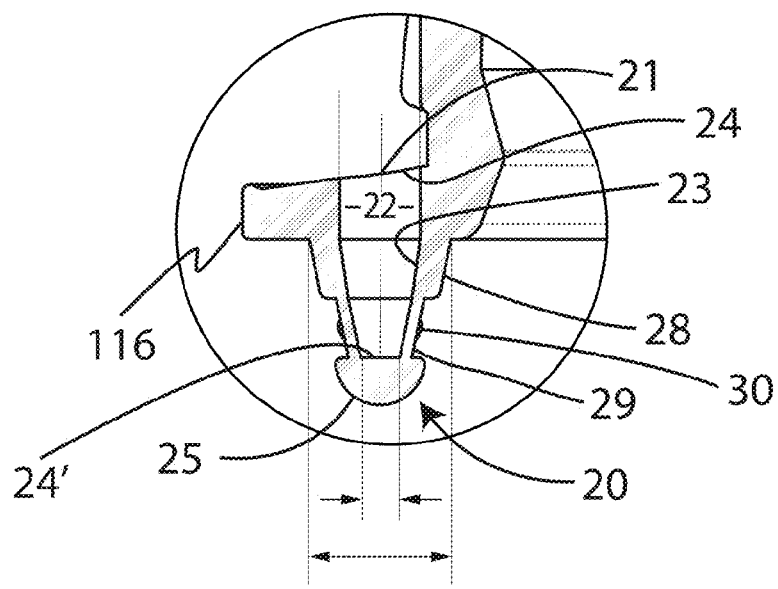
FIG. 17A is a partial cross-sectional view of the flow control valve assembly as illustrated in Inset 17A of FIG. 17.

With reference to FIG. 17A, and as disclosed above, in at least one embodiment a training cup spout assembly 100 in accordance with the present invention further comprises a flow control valve assembly 20, such as is disclosed above with reference to FIGS. 1 through 5. More in particular, and as shown in FIG. 17A, a flow control valve assembly 20 is mounted to a spout flange 116 and comprises a port 21 disposed through a portion of the spout flange 116. The flow control valve assembly 20 further comprises a channel 22, and in at least one embodiment, such as illustrated in FIG. 17A, the flow control valve assembly 20 comprises an elongated channel 22. In at least one further embodiment, the elongated channel 22 is substantially surrounded by a channel wall 23, and the elongated channel 22 comprises an open proximal end 24 and oppositely disposed distal end 24'. The open proximal end 24 of the elongated channel 22 is disposed in a fluid communicating relation with the port 21, as shown in FIG. 17A.

The channel wall 23 in accordance with at least one embodiment of the present disclosure, includes a fixed wall 28 attached to the spout flange 116 and positioned along and around a periphery the port 21. The channel wall 23 in accordance with yet one further embodiment comprises an expandable wall 29 as shown in the figures. The expandable wall 29 is attached to a distal end of the fixed wall 29 along and around a periphery thereof. A channel header 25 is attached to a distal end of the expandable wall 29 and in at least one embodiment, the channel header 25 is attached to the expandable wall 29 in a sealing engagement with the distal end 24' of the channel 22.

Looking further to the illustrative embodiment of FIG. 17A, the flow control valve assembly 20 in accordance with the present disclosure includes at least one valve member 30 mounted to the expandable wall 29 of the elongated channel 22. In at least one embodiment, a flow control valve assembly 20 comprises a plurality of valve members 30, and in yet one further embodiment, a flow control valve assembly 20 comprises a plurality of unidirectional valve members 30, as previously disclosed in detail above.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A flow control valve assembly comprising:
    a valve mount,
    a port extending through a portion of said valve mount,
    a channel having a proximal end and an oppositely disposed distal end,
    said proximal end of said channel disposed in fluid communication with said port,
    a fixed wall attached to said valve mount along and around a periphery of said port, said fixed wall at least partially defining a first portion of said channel,
    an expandable wall attached along and around a periphery of said fixed wall at least partially defining a second portion of said channel,
    a channel header attached to said expandable wall, said channel header sealing said distal end of said channel, and
    at least one valve member mounted to said expandable wall, wherein said at least one valve member comprises complementary sealing surfaces disposable between an open orientation and a closed orientation, said open orientation at least partially defined by said complementary sealing surfaces positioned a spaced distance apart from one another to form a pressure equilibration flow path therebetween to permit pressures to equilibrate on opposite sides of said channel.

2. The flow control valve assembly as recited in claim 1 further comprising a plurality of valve members mounted to said expandable wall, wherein each of said plurality of valve members comprise complementary sealing surfaces correspondingly disposable between an open orientation and a closed orientation.

3. The flow control valve assembly as recited in claim 2 wherein each of said plurality of valve members comprise a unidirectional pressure equilibration valve member.

4. The flow control valve assembly as recited in claim 1 wherein a mean thickness of said expandable wall is less than one half of a mean thickness of said fixed wall.

5. The flow control valve assembly as recited in claim 4 wherein said expandable wall comprises a resilient construction to permit said substantially planar complementary sealing surfaces to be positioned said spaced distance apart from one another to form said pressure equilibration flow path therebetween.

6. A training cup spout assembly removably attachable to a drinking cup, said spout assembly comprising:
    a spout having a spout channel extending therethough, said spout channel surrounded by a channel wall and having an open proximal end and an oppositely disposed open distal end,
    said spout attached to and extending outwardly from a spout flange,
    said spout comprising a dual valve assembly mounted in said spout channel, said dual valve assembly comprising:
        a diaphragm valve member mounted in said spout channel between said oppositely disposed open ends,
        said diaphragm valve member comprising a pair of diaphragm surfaces, each of said diaphragm surfaces attached in a sealing engagement along oppositely disposed internal surfaces of said spout channel, said diaphragm surfaces defining a diaphragm aperture therebetween, a dome valve member mounted to said diaphragm valve member, said dome valve member disposed in an overlying relation to said diaphragm aperture, said dome valve member comprising complementary sealing surfaces disposable between a closed orientation and an open orientation, wherein said closed orientation is at least partially defined by said complementary sealing surfaces abutting one another and said open orientation is at least partially defined by said complementary sealing surfaces positioned a spaced distance apart from one another to form a fluid flow path from said open distal end of said spout channel, between said complementary sealing surfaces of said dome valve member, through said diaphragm aperture, and to said open proximal end of said spout channel, and a flow control valve assembly mounted to said spout flange, wherein said flow control valve assembly extends inwardly from an inner surface of said spout flange, said flow control valve assembly comprising:

a port disposed through a portion of said spout flange, an elongated channel substantially surrounded by a channel wall, said elongated channel having an open proximal end and an oppositely disposed distal end, said open proximal end of said elongated channel disposed in fluid communication with said port, said channel wall comprising a fixed wall attached to said spout flange along and around a periphery of said port, said channel wall further comprising an expandable wall attached along and around a periphery of said fixed wall, a channel header attached to said expandable wall, said channel header sealing said distal end of said elongated channel, and at least one valve member mounted to said expandable wall, wherein said at least one valve member comprises complementary sealing surfaces disposable between a closed orientation and an open orientation, wherein said closed orientation is at least partially defined by corresponding ones of said complementary sealing surfaces abutting one another and said open orientation is at least partially defined by corresponding ones of said complementary sealing surfaces positioned a spaced distance apart from one another forming a pressure equilibration flow path therebetween permitting air to flow in from said elongated channel to equilibrate pressures on opposite sides of said channel wall.

7. The flow control valve assembly as recited in claim 6 further comprising a plurality of valve members mounted to said expandable wall, wherein each of said plurality of valve members comprise complementary sealing surfaces correspondingly disposable between an open orientation and a closed orientation.

8. The flow control valve assembly as recited in claim 7 wherein each of said plurality of valve members comprise a unidirectional pressure equilibration valve member.

9. The spout assembly as recited in claim 6 wherein said fixed wall comprises a mean thickness in a range of about 1.2 millimeters to about 1.8 millimeters.

10. The spout assembly as recited in claim 9 wherein said expandable wall comprises a mean thickness in a range of about 0.4 millimeters to about 0.8 millimeters.

11. The spout assembly as recited in claim 10 wherein said expandable wall comprises a resilient construction to permit corresponding ones of said complementary sealing surfaces to be positioned said spaced distance apart from one another to form said pressure equilibration flow path therebetween, and to permit corresponding ones of said complementary sealing surfaces to return to abutting one another in said closed orientation.

12. The spout assembly as recited in claim 6 wherein each of said diaphragm surfaces is attached at an angle relative to said internal surfaces of said spout channel wall.

13. The spout assembly as recited in claim 12 wherein said angle in a range of about 140 degrees to 160 degrees.

14. The spout assembly as recited in claim 13 wherein said diaphragm surfaces comprise a mean thickness and said dome valve member comprises a mean thickness.

15. The spout assembly as recited in claim 14 wherein said mean thickness of said diaphragm surfaces is in a range of about 0.6 millimeters to 0.8 millimeters.

16. The spout assembly as recited in claim 15 wherein said mean thickness of said dome valve member is in a range of about 1.2 millimeters to 1.6 millimeters.

17. The spout assembly as recited in claim 14 wherein said mean thickness of said diaphragm surfaces is about one half said mean thickness of said dome valve member.

18. A training cup spout assembly removably attachable to a drinking cup, said spout assembly comprising:

a spout having a spout channel extending therethough, said spout channel surrounded by a channel wall and having an open proximal end and an oppositely disposed open distal end, said spout attached to and extending outwardly from a spout flange, said spout comprising a dual valve assembly mounted in said spout channel, said dual valve assembly comprising:

a diaphragm valve member mounted in said spout channel between said oppositely disposed open ends, and a dome valve member mounted to said diaphragm valve member, said dome valve member disposed in an overlying relation to said diaphragm aperture, and a flow control valve assembly mounted to said spout flange disposable between a closed orientation and an open orientation, wherein said open orientation permits pressures to equilibrate on opposite sides of said flow control valve assembly.

19. The spout assembly as recited in claim 18 wherein said flow control valve assembly comprises a dome flow control valve.

20. The spout assembly as recited in claim 18 wherein said flow control valve assembly comprises at least one valve member mounted to an expandable wall.

* * * * *